US009783107B2

(12) United States Patent
Sakamoto et al.

(10) Patent No.: US 9,783,107 B2
(45) Date of Patent: Oct. 10, 2017

(54) VEHICLE APPROACH ALERT DEVICE

(71) Applicants: Anden Co., Ltd., Anjo, Aichi-pref. (JP); TOYOTA JIDOSHA KABUSHIKI KAISHA, Toyota-shi, Aichi-ken (JP)

(72) Inventors: Hitoshi Sakamoto, Anjo (JP); Hironari Tajimi, Anjo (JP); Chikara Yamamoto, Anjo (JP); Tomonori Suzuki, Seto (JP); Tadashi Matsui, Kasugai (JP)

(73) Assignees: Anden Co., Ltd., Anjo, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/298,318

(22) Filed: Oct. 20, 2016

(65) Prior Publication Data
US 2017/0151907 A1 Jun. 1, 2017

(30) Foreign Application Priority Data
Nov. 27, 2015 (JP) ................................. 2015-232034

(51) Int. Cl.
*B60Q 1/00* (2006.01)
*B60Q 5/00* (2006.01)
(52) U.S. Cl.
CPC .................................. *B60Q 5/006* (2013.01)
(58) Field of Classification Search
CPC ..................................................... B60C 5/006
USPC ....... 340/901, 903, 904, 905, 925, 944, 988, 340/425.5, 426.22, 426.23, 463, 464, 692, 340/693.8
See application file for complete search history.

(56) References Cited

U.S. PATENT DOCUMENTS

| 7,982,629 | B2 * | 7/2011 | Crowe | H04H 20/55 340/692 |
| 2008/0114904 | A1 * | 5/2008 | Kosco | B60Q 5/00 710/13 |
| 2013/0249680 | A1 | 9/2013 | Goto | |
| 2016/0068102 | A1 | 3/2016 | Tsuzuki et al. | |
| 2016/0241960 | A1 * | 8/2016 | Cheng | H04R 29/001 |

FOREIGN PATENT DOCUMENTS

JP 2009-101895 A 5/2009
WO WO-2014/184829 A1 11/2014

* cited by examiner

*Primary Examiner* — Daryl Pope
(74) *Attorney, Agent, or Firm* — Harness, Dickey & Pierce, P.L.C.

(57) ABSTRACT

A vehicle approach alert device that outputs an approach report sound from a sounding body includes: a memory part in which data of the approach report sound is memorized; a signal generator that generates a voltage waveform signal of the approach report sound based on the data of the approach report sound; a calculator that calculates a temperature of the sounding body; and a correct part that corrects the approach report sound based on the temperature of the sounding body. The calculator acquires information about a temperature detected by a temperature sensor located at a position different from the sounding body in the vehicle, and estimates the temperature of the sounding body based on the temperature detected by the temperature sensor.

6 Claims, 4 Drawing Sheets

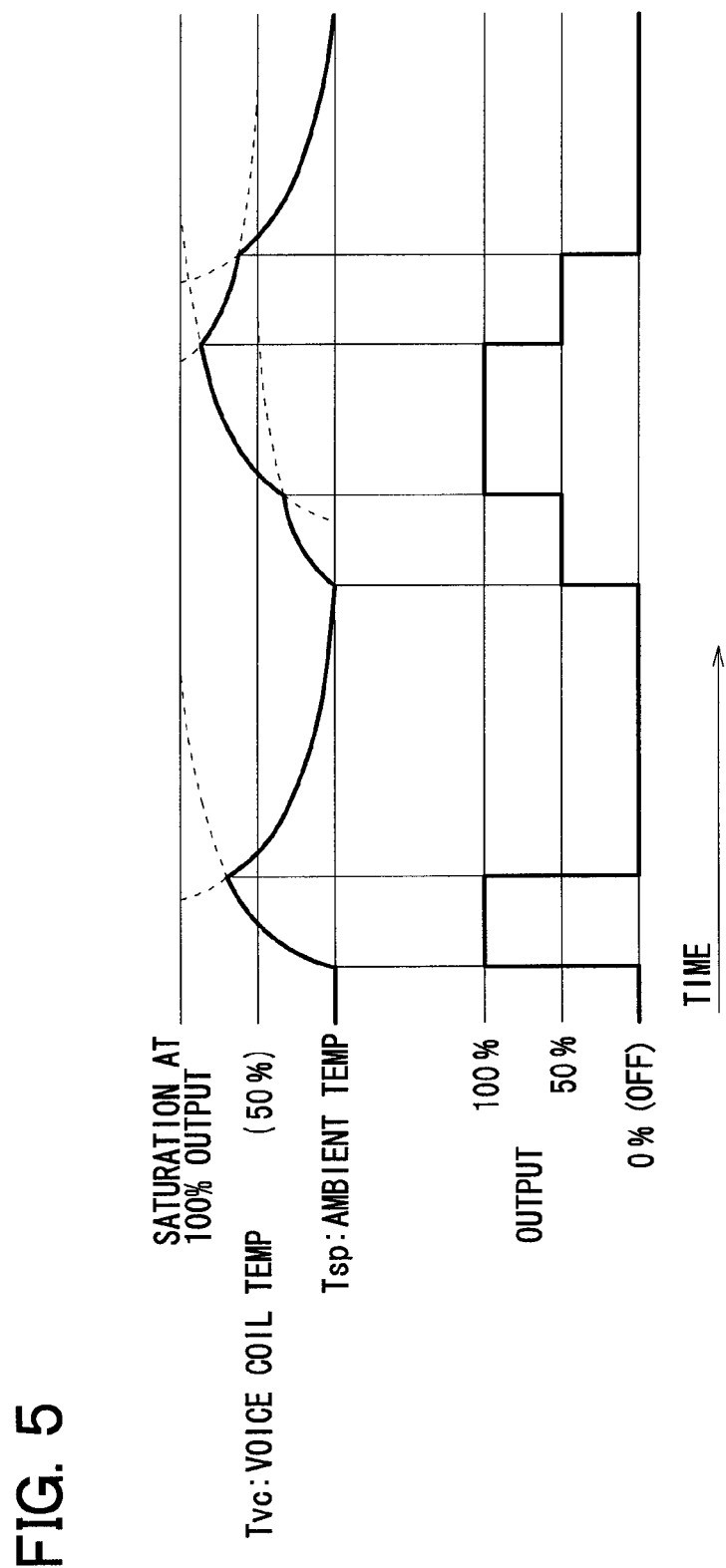

VEHICLE APPROACH ALERT DEVICE

CROSS REFERENCE TO RELATED APPLICATION

This application is based on Japanese Patent Application No. 2015-232034 filed on Nov. 27, 2015, the disclosure of which is incorporated herein by reference in its entirety.

TECHNICAL FIELD

The present disclosure relates to a vehicle approach alert device.

BACKGROUND

In recent years, a vehicle approach alert device is mounted on an electric vehicle (EV) or a hybrid vehicle (HV) to generate false drive sound, such that a pedestrian can easily notice an approach of the vehicle.

The vehicle approach alert device emits an approach report sound such as false drive sound through a speaker, and a sound pressure of the sound output from the speaker is set in consideration of both of the report property and the noise property. A resistance of a voice coil of the speaker changes according to the temperature of the speaker. As a result, the sound pressure output from the speaker changes. WO 2014/184829 A1 describes that a temperature of a speaker is detected by a temperature sensor attached to near or inside of the speaker, and that a sound pressure output from the speaker is corrected in consideration of the change in the resistance of a voice coil.

SUMMARY

However, the number of components is increased only for detecting the temperature of the speaker in case where the temperature sensor is arranged near or inside of the speaker as an additional component.

Moreover, the correction is made only in consideration of the change in the resistance of the voice coil of the speaker, and a voltage input to the speaker is simply increased or decreased. The temperature characteristic of the speaker also affects the frequency characteristic with respect to the sound pressure output from the speaker, due to the resistance of the voice coil, the hardness of a cone paper, and the like. If a frequency gap arises in the output sound, the audible sound may become large or small compared with a desired level.

It is an object of the present disclosure to provide a vehicle approach alert device by which a sound pressure output from a sounding body such as speaker can be corrected based on the temperature without adding a temperature sensor as an additional component only for detecting the temperature of the sounding body.

It is an object of the present disclosure to provide a vehicle approach alert device by which a change in the audible sound can be reduced when the temperature of the sounding body changes.

According to an aspect of the present disclosure, a vehicle approach alert device that outputs an approach report sound representing an approach of a vehicle from a sounding body includes: a memory part in which data of the approach report sound is memorized; a signal generator that reads out the data of the approach report sound from the memory part and that generates a voltage waveform signal of the approach report sound based on the data of the approach report sound; a calculator that calculates a temperature of the sounding body; and a correct part that corrects the approach report sound based on the temperature of the sounding body calculated by the calculator. The calculator acquires information about a temperature detected by a temperature sensor located at a position different from the sounding body in the vehicle, and estimates the temperature of the sounding body based on the temperature detected by the temperature sensor.

Thus, a variation in the approach report sound caused by a temperature change can be restricted by correcting the approach report sound according to the temperature of the sounding body. The temperature of the sounding body is presumed using the detection result of the temperature sensor which detects the temperature of another in-vehicle component at a position different from the sounding body. For this reason, without providing a temperature sensor only for detecting the temperature of the sounding body, it becomes possible to correct the sound pressure of sound output from the sounding body based on the presumed temperature.

For example, the temperature sensor detects an outside air temperature outside of the vehicle. The calculator may acquire information about the outside air temperature to estimate the temperature of the sounding body based on the outside air temperature.

The vehicle approach alert device may further include another temperature sensor that detects a temperature of another component different from the sounding body in the vehicle. The calculator acquires information about the temperature of the another component, and estimates the temperature of the sounding body based on the outside air temperature and the temperature of the another component.

Specifically, the another component may be one of a plurality of another components. The memory part memorizes a correlation between the temperature of the sounding body and the respective temperatures of the another components. The calculator calculates a variation in the temperature of the sounding body from the outside air temperature based on the temperatures of the another components in the vehicle using the correlation and the information about the temperatures of the another components in the vehicle.

The calculator may calculate multiplication values by multiplying the outside air temperature and the temperatures of the another components by respective predetermined coefficients. The calculator calculates the temperature of the sounding body based on a sum of the multiplication values.

The calculator may acquire information about a speed of the vehicle. The calculator calculates a reduction value by multiplying the speed of the vehicle by a natural air cooling coefficient of the sounding body corresponding to the speed of the vehicle. The calculator calculates the temperature of the sounding body by subtracting the reduction value from the sum.

Thus, the decrease in temperature of the sounding body corresponding to the speed of the vehicle can be considered in the calculation of the sounding body temperature, such that the sounding body temperature can be more accurately estimated.

BRIEF DESCRIPTION OF THE DRAWINGS

The above and other objects, features and advantages of the present disclosure will become more apparent from the following detailed description made with reference to the accompanying drawings. In the drawings:

FIG. 5 is a graph illustrating a temperature change of the voice coil with respect to a sound output.

DETAILED DESCRIPTION

Figure 1:
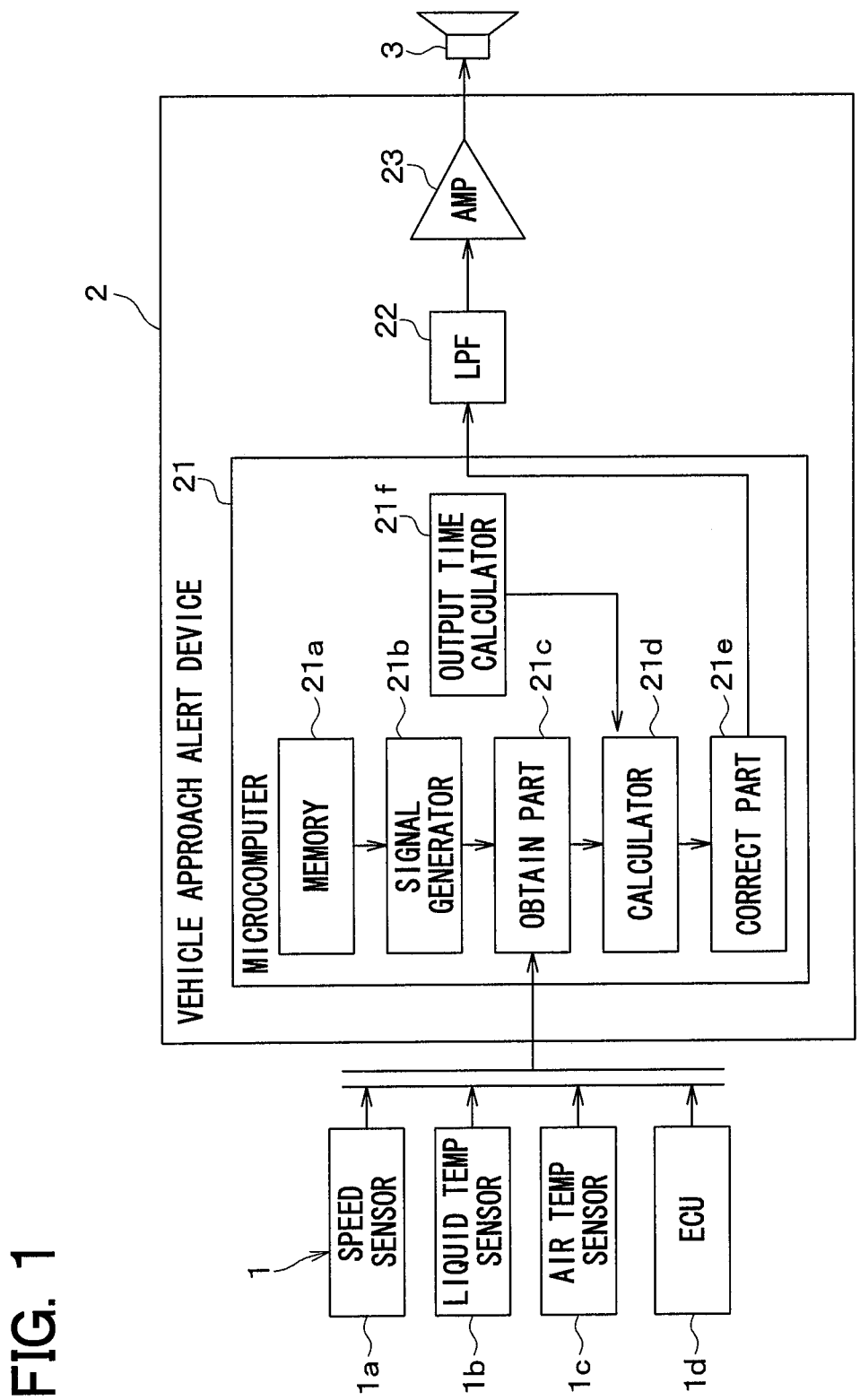
FIG. 1 is a block diagram illustrating a vehicle approach alert device according to an embodiment.

Embodiments of the present disclosure will be described hereafter referring to drawings. In the embodiments, a part that corresponds to a matter described in a preceding embodiment may be assigned with the same reference numeral, and redundant explanation for the part may be omitted.

FIG. 1 is a block diagram illustrating a vehicle approach report system including a vehicle approach alert device according to the present embodiment.

As shown in FIG. 1, the vehicle approach report system includes an information input unit 1, a vehicle approach alert device 2, and a speaker 3 (sounding body). In the vehicle approach report system, the vehicle approach alert device 2 controls the speaker 3 to emit false drive sound based on the variety of information provided from the information input unit 1, when the vehicle drives at low-speed, such that the approach of the vehicle is notified to a pedestrian around the vehicle. In this embodiment, the vehicle approach alert device 2 is provided separately from the speaker 3. Alternatively, the speaker 3 may be formed integrally with the vehicle approach alert device 2.

The information input unit 1 inputs information to the vehicle approach alert device 2. Specifically, a speed sensor 1a, a liquid temperature sensor 1b, an outside air temperature sensor 1c, and an electronic control unit (ECU) 1d for controlling the engine of the vehicle input information to the vehicle approach alert device 2 as the information input unit 1.

The speed sensor 1a outputs a detection signal of the vehicle speed to the vehicle approach alert device 2. The liquid temperature sensor 1b outputs a detection signal of a cooling water temperature (radiator water) or/and an oil temperature (engine oil) to the vehicle approach alert device 2. The liquid temperature sensor 1b may be one temperature sensor which detects either the cooling water temperature or the oil temperature. The liquid temperature sensor 1b may include two sensor portions. One of the two sensor portions detects and outputs the cooling water temperature to the vehicle approach alert device 2, and the other detects and outputs the oil temperature to the vehicle approach alert device 2. The outside air temperature sensor 1c outputs a detection signal of outside air temperature outside of the vehicle to the vehicle approach alert device 2. The engine ECU 1d outputs information about an operation time of the engine to the vehicle approach alert device 2, among various physical quantities used for controlling the engine, as a drive ability (state) of the vehicle.

The detection signal of the sensor 1a, 1b, 1c and the information from the engine ECU 1d are inputted to the vehicle approach alert device 2, for example, through a LAN in the vehicle. The detection signal of each sensor 1a, 1b, 1c may be directly inputted to the vehicle approach alert device 2, or indirectly inputted to the vehicle approach alert device 2 through another electronic control unit as speed information and temperature information.

When ECU for controlling a meter acquires the vehicle speed from the speed sensor 1a as a speed detection signal, the speed information may be input to the vehicle approach alert device 2 from the ECU for controlling the meter. When the engine ECU 1d acquires the temperature of water or oil from the liquid temperature sensor 1b, the engine ECU 1d may input the temperature information to the vehicle approach alert device 2. When ECU for controlling an air-conditioner of the vehicle acquires outside air temperature from the outside air temperature sensor 1c, the information of outside air temperature may be input to the vehicle approach alert device 2 from the ECU for the air-conditioner.

The liquid temperature sensor 1b and the outside air temperature sensor 1c are originally mounted on the vehicle. In other words, the liquid temperature sensor 1b and the outside air temperature sensor 1c are not additional components only for detecting the temperature of the speaker 3.

The vehicle approach alert device 2 controls the sound output according to the variety of information such as the vehicle speed, the liquid temperature, the outside air temperature, or the engine operation time provided from the information input unit 1. Specifically, the vehicle approach alert device 2 has a microcomputer (micro controller) 21, a low pass filter (LPF) 22, and a power amplifier (AMP) 23.

The microcomputer 21 includes a memory part 21a, a signal generator 21b, an obtain part 21c, a calculator 21d, a correct part 21e that corrects the sound pressure and the frequency, and an output time calculator 21f.

The memory part 21a memorizes various control programs and data of the approach report sound as a sound source data of the approach report sound. The memory part 21a memorizes, for example, pulse code modulation (PCM) data of the approach report sound, and the control program for controlling the approach report sound to correct the sound pressure and the frequency in view of the speaker temperature.

The signal generator 21b generates a voltage waveform signal for outputting the approach report sound based on the data of the approach report sound memorized by the memory part 21a.

The obtain part 21c acquires a variety of information from the information input unit 1. The obtain part 21c acquires the information about the drive state of the vehicle from the speed sensor 1a, the liquid temperature sensor 1b, the outside air temperature sensor 1c, and the engine ECU 1d of the information input unit 1.

The variety of information acquired from the information input unit 1 is an external factor relevant to a change in the speaker temperature. As the vehicle speed becomes higher, the wind pressure applied to the speaker 3 becomes stronger, and the speaker temperature decreases. Moreover, the speaker temperature is changed by the influence of temperature of a component around the speaker 3, such as engine or radiator. Furthermore, the speaker temperature is basically changed by the outside air temperature. Thus, the obtain part 21c obtains parameters of the external factors affecting the speaker temperature from the information input unit 1 as the variety of information.

When the information provided from the information input unit 1 is detection signals of the sensors 1a-1c, the obtain part 21c obtains the vehicle speed, the cooling water temperature, the engine oil temperature, and the outside air temperature based on the detection signals.

The calculator 21d presumes and calculates the speaker temperature based on the variety of information acquired by the obtain part 21c, and a sound output time period of the speaker 3 transmitted from the output time calculator 21f. The specific calculation technique by the calculator 21d is mentioned later.

The correct part 21e corrects the amplitude of the sound pressure and the frequency of the output sound output from the speaker 3 based on the speaker temperature calculated by the calculator 21d, by correcting the voltage waveform signal of the approach report sound When the sound is emitted from the speaker 3. The corrected voltage waveform signal of the approach report sound of the speaker output sound pressure and the frequency is transmitted to LPF 22. The correcting technique by the correct part 21e is mentioned later.

The output time calculator 21f calculates the output time period of the sound from the speaker 3, and the calculated time period is transmitted to the calculator 21d. Because the speaker temperature rises as the output time period is increased, the output time period of the speaker 3 corresponds to an internal factor affecting the change in the speaker temperature.

The output time calculator 21f counts the output time period started from when the sound output from the speaker is started in response to the drive start of the vehicle to when the sound output is stopped. The output time period is counted by the output time calculator 21f during a starting operation of the vehicle, and is reset when the starting operation of the vehicle is finished. It can be determined whether the vehicle is in the starting operation or not, for example, based on the drive state of the vehicle. The output time calculator 21g measures the output time period during which the vehicle is in the starting operation. Moreover, the output time calculator 21f measures and transmits a lapsed time elapsed after stopping the sound output from the speaker 3 to the calculator 21d together with the output time period, because the speaker temperature falls after the sound output from the speaker 3 stops. The speaker temperature can be more correctly calculated by the calculator 21d in consideration of the temperature rise based on the output time period and the temperature fall based on the lapsed time after stopping the sound output.

LPF 22 is equivalent to a filter part. The voltage waveform signal of the approach report sound outputted from the microcomputer 21 is inputted into LPF 22. The noise component of high frequency is removed by LPF 22, and a voltage waveform signal of the approach report sound is generated after the noise removal. For example, LPF 22 stores voltage corresponding to the output in the internal capacitor, and outputs the voltage to AMP 23.

AMP 23 outputs a current corresponding to the output of LPF 22 to the speaker 3 based on a voltage impression from a source of constant voltage (not shown). The sound pressure output from the speaker 3 is decided according to the magnitude (amplitude) of the current supplied from AMP 23. The current supplied from AMP 23 is decided by the output waveform of LPF 22 corresponding to the PWM output. For this reason, the current supplied from AMP 23 can be controlled based on the voltage waveform signal of the approach report sound after being corrected based on the speaker temperature.

The speaker 3 emits the approach report sound with the frequency and the sound pressure level according to the voltage waveform signal of the approach report sound sent through AMP 23. The speaker 3 includes a voice coil. The voice coil is activated when the voltage waveform signal of the approach report sound is transmitted to the voice coil. The movement of the voice coil is transmitted to a diaphragm and is changed to the approach report sound.

Next, the technique of correcting the sound pressure and the frequency by the correct part 21e and a method of estimating the speaker temperature by the calculator 21d are explained.

The correct part 21e corrects the voltage level of the voltage waveform signal of the approach report sound according to the speaker temperature. Specifically, the correct part 21e calculates an amplitude coefficient k1 of the voltage waveform signal of the approach report sound. The correct part 21e multiplies the voltage waveform signal of the approach report sound by the calculated amplitude coefficient k1, such that a voltage waveform signal of the approach report sound in which the sound pressure is corrected is generated.

Specifically, the correct part 21e calculates the amplitude coefficient k1 corresponding to the speaker temperature calculated by the calculator 21d, using a computing equation or map memorized by the memory part 21a. The memory part 21a memorizes the computing equation or map which represents a relation of the sound pressure level and the temperature within an assumed temperature range corresponding to a temperature change of the place at which the speaker 3 is located. The speaker temperature is incorporated into the computing equation to calculate the amplitude coefficient k1, or the amplitude coefficient k1 corresponding to the speaker temperature is chosen from the map. The speaker temperature is obtained from the result of the calculation performed in the calculator 21d.

Figure 2:
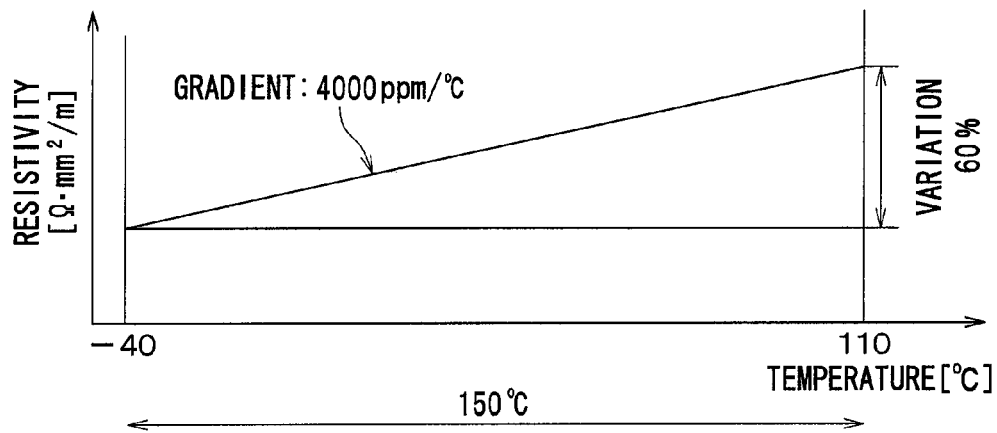
FIG. 2 is a graph illustrating a relationship between temperature and resistivity of a voice coil of a speaker of the vehicle approach alert device.
Figure 3:
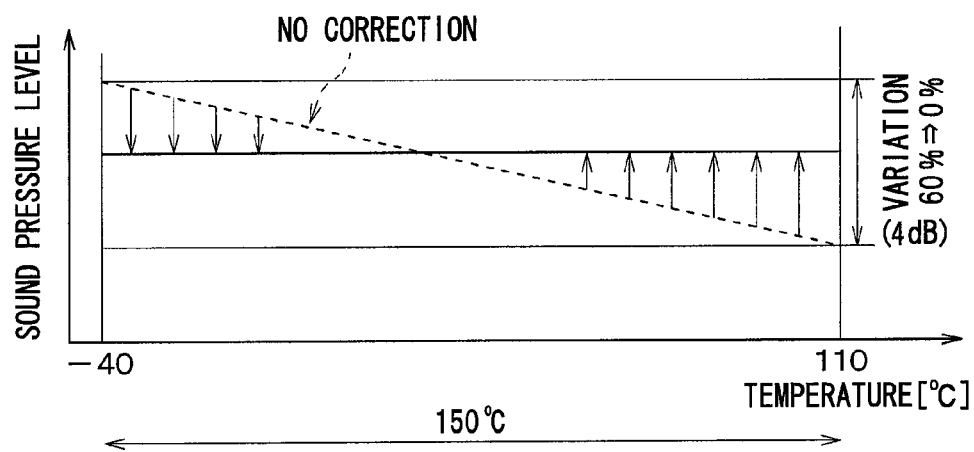
FIG. 3 is a graph illustrating a relationship between temperature and sound pressure level.

FIG. 2 is a graph illustrating a relationship between a temperature and a resistivity of the voice coil of the speaker 3, and FIG. 3 is a graph illustrating a relation between a temperature and a sound pressure level.

The voice coil of the speaker 3 is made of, for example, copper. Since the temperature coefficient of the resistivity of copper is about 4000 ppm/° C., as shown in FIG. 2, the impedance of the voice coil changes by about 60% relative to the temperature width of 150° C. from −40° C. to 110° C.

For this reason, as shown in a dashed line (no correction) of FIG. 3, if the voltage level of the voltage waveform signal of the approach report sound is not corrected in connection with the temperature change, the sound pressure level of the approach report sound actually outputted from the speaker 3 falls as the temperature is raised. For example, if the temperature changes from −40° C. to 110° C., the sound pressure level falls by 4 dB simply only under the influence of the temperature change by 150° C.

According to the present embodiment, the correct part 21e calculates the amplitude coefficient k1 according to the speaker temperature, and the voltage waveform signal of the approach report sound is multiplied by the amplitude coefficient k1, such that the sound pressure level at the speaker 3 can be corrected. When the approach report sound is emitted from the speaker 3, the sound pressure level can be made to have a steady value.

Specifically, the voltage level of the voltage waveform signal of the approach report sound is corrected by increasing the amplitude coefficient k1 as the speaker temperature is raised. For example, the sound pressure level at the speaker 3 is set on the basis of normal temperature (about 25° C.) as a standard, and the sound pressure level at the standard is set as a value which satisfies both of the report property and the noise property. When the temperature is lower than the standard temperature, the amplitude coefficient k1 is set as k1<1 to lower the voltage level of the voltage waveform signal of the approach report sound. When the temperature is more than the standard temperature, the amplitude coefficient k1 is set as k1>1 to raise the voltage level of the voltage waveform signal of the approach report sound. According to the present embodiment, the sound pressure level at the speaker 3 can be made to have a steady value even when the temperature change, as shown in a solid line of FIG. 3.

The sound pressure level output from the speaker 3 may be within a predetermined range, not limited to be made into the steady value. For example, a variation in the sound pressure level may be set within a predetermined range such as 2 dB relative to a temperature range where the speaker 3 is used.

The correct part 21e corrects the frequency of the voltage waveform signal of the approach report sound according to the speaker temperature. Generally, the characteristic of the sound source data (henceforth referred to a sound source characteristic) used as an approach report sound is set according to the frequency characteristic of the speaker 3 (henceforth referred to a speaker frequency characteristic). Therefore, a change in the speaker frequency characteristic may produce unintentional change in the sound pressure and tone. The speaker frequency characteristic changes according to a change in the hardness of the cone paper (not shown) of the speaker 3 in response to the temperature change. The correct part 21e performs minute correction in the pitch of the approach report sound according to the change in the speaker frequency characteristic in response to the change in the speaker temperature change. The correction in the frequency is performed combining with the correction in the amplitude of the sound pressure corresponding to the speaker temperature.

Figure 4:
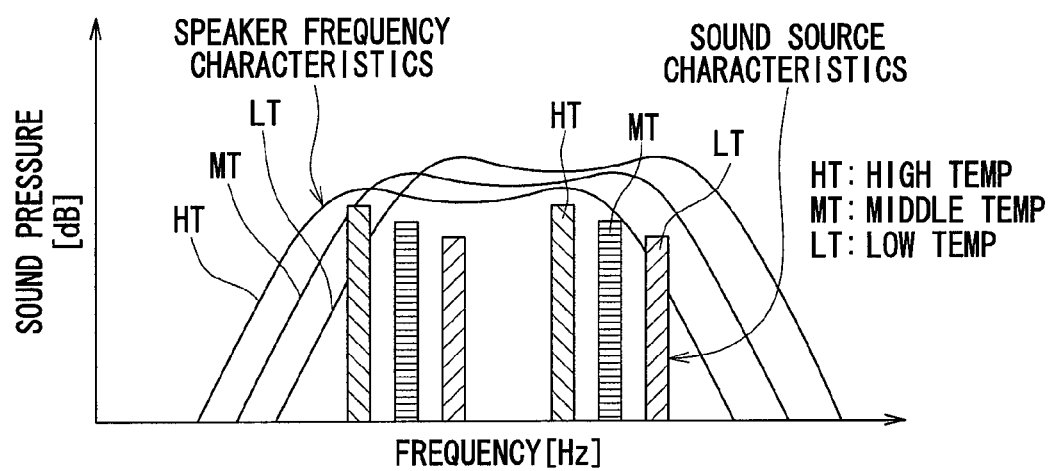
FIG. 4 is a graph illustrating speaker frequency characteristic and sound source characteristic.

As shown in FIG. 4, the speaker frequency characteristic and the sound source characteristic change depending on the speaker temperature. Specifically, the speaker frequency characteristic and the sound source characteristic change depending on the change in the hardness of the cone paper in response to the temperature change. Since the resonance frequency of the cone paper is decided by the hardness of the cone paper, the resonance frequency is changed by the hardness change resulting from the temperature change of the cone paper. As a result, the speaker frequency characteristic and the sound source characteristic change.

The speaker frequency characteristic is shown by the waveform shown in FIG. 4, in which the peak frequency is different depending on the temperature, among a high temperature, a middle (normal) temperature, and a low temperature of the speaker temperature. The peak frequency becomes higher as the speaker temperature is lower.

The sound source characteristic shown in FIG. 4 represents a change in the efficiency of two typical components, i.e., low frequency band and high frequency band, in the frequency band used as a sound source. The efficiency changes in each of the low temperature, the middle temperature, and the high temperature depending on the frequency, and the efficiency falls as the speaker temperature is raised. The efficiency is decreased as the sound pressure of the sound source is increased.

For this reason, the frequency of the approach report sound is corrected based on the speaker temperature so as to precisely tune the pitch. For example, when the speaker temperature is higher than a normal temperature, the frequency of the approach report sound is raised compared with the time of normal temperature. When the speaker temperature is lower than the normal temperature, the frequency of the approach report sound is lowered compared with the time of normal temperature. Thus, the speaker frequency characteristic is corrected to approach to that at the normal temperature.

Moreover, the sound pressure of each component in the frequency band currently used as an approach report sound is changed based on the speaker temperature. For example, when the speaker temperature is higher than the normal temperature, the sound pressure of the frequency component of the approach report sound is lowered. When the speaker temperature is lower than the normal temperature, the sound pressure of the frequency component of the approach report sound is raised. Thus, the sound source characteristic is corrected to approach to that at the normal temperature. Accordingly, the audible approach report sound can be restricted from changing when the speaker temperature changes.

Thus, the correct part 21e corrects the amplitude of the sound pressure and the frequency of the approach report sound according to the speaker temperature. Accordingly, the audible approach report sound can be restricted from changing when the speaker temperature changes.

Next, the technique of estimating and calculating the speaker temperature by the calculator 21d is explained. The speaker temperature is estimated by estimating the ambient temperature around the speaker 3 (henceforth referred to speaker ambient temperature) and by estimating the increase in the temperature of the voice coil of the speaker 3.

The speaker ambient temperature, i.e., the ambient temperature of the voice coil, is raised by other components such as engine or radiator mounted on the vehicle as a heat source. The correlation between the ambient temperature at the loading position of the speaker 3 and the temperature information such as cooling water temperature, oil temperature, outside air temperature, acquired through a communication system in the vehicle is measured beforehand. As the correlation, coefficients a1 b1, and c1 to be multiplied with the temperature detected by the sensor 1a, 1b, and 1c when presuming the speaker ambient temperature is calculated. The speaker ambient temperature is presumed based on the sum of the multiplication values calculated by multiplying the detected temperatures with the respective coefficients. Since the speaker position and the other heat source position in the vehicle change depending on the vehicle, it needs to calculate the coefficients individually. Moreover, when the vehicle is travelling, natural air cooling which arises due to air flow depending on the speaker position is also considered. It is regarded that the natural air cooling is proportional to the vehicle speed. The natural cooling coefficient is set in consideration of the speaker position. The value (reduction value) obtained by multiplying the vehicle speed by the natural cooling coefficient is subtracted from the sum of the multiplication values.

Specifically, the speaker ambient temperature Tsp is calculated based on the following mathematical expression 1, in which Tair is the outside air temperature information, a1 is a coefficient for the outside air temperature, Tra is the water temperature information, b1 is a coefficient for the water temperature, Toil is the oil temperature information, c1 is a coefficient for the oil temperature, SPD is the vehicle speed information, and k2 is a coefficient of the natural air cooling with respect to the vehicle speed.

$$Tsp = a1 \cdot Tair + b1 \cdot Tra + c1 \cdot Toil - k2 \cdot SPD \quad \text{(Mathematical expression 1)}$$

The increase in the temperature of the voice coil is presumed and calculated based on the sound output time from the speaker 3, the lapsed time after stopping the sound output, and an output ratio (%) of the speaker 3.

Since the sound output waveform set up as an approach report sound is reproduced repeatedly as a fixed tone, the approach report sound can be considered as an ordinary wave. The heat loss at the sound producing time is proportional to a value obtained by multiplying the output waveform, the output amplitude, and the output time of the approach report sound, that is, the square of the integration value of the output voltage. Therefore, the position in the temperature increasing curve or decreasing curve shown in FIG. 5 can be determined based on the sum of the heat loss produced in the voice coil and the speaker ambient temperature Tsp. The output in FIG. 5 represents an electric power.

For example, the temperature increasing curve is shown by the following formula, $$Tvc = a2\left(1 - e^{-\frac{1}{\tau}t}\right) + Tsp$$

in which Tvc is the temperature of the voice coil, a2 is an asymptote of the temperature increasing curve, and τ is a time constant. Both of a2 and τ are positive constants. The asymptote a2 is proportional to the heat loss at the sound output time, and the time constant τ depends on the heat dissipation property. The asymptote a2 and the time constant τ can be obtained beforehand by measuring or calculation.

The temperature decreasing curve is determined based on a difference between the voice coil temperature Tvc when the sound output is stopped and the speaker ambient temperature Tsp, the lapsed time after stopping the sound output, and the material of the voice coil. Therefore, the voice coil temperature Tvc can be calculated by adding the temperature increase based on the temperature increasing curve at the sound output time, or by reducing the temperature decrease based on the temperature decreasing curve at the sound stop time, with respect to the speaker ambient temperature Tsp.

The temperature of the voice coil is presumed by adding the temperature increase and by subtracting the temperature decrease in consideration of the output time period of the approach report sound when the vehicle is in the driveable state and the lapsed time after stopping the sound output. Thereby, the speaker temperature can be calculated correctly corresponding to the temperature change of the voice coil from the starting of the vehicle.

The output ratio of the speaker 3 can be set according to, for example, the vehicle speed. The output ratio of the speaker 3 represents a ratio of an actual output to the maximum output (100%) which is the maximum relative to the sound pressure level of the approach report sound. In other words, the maximum output is the maximum value of the output ratio of the sound pressure level. Specifically, the output ratio of the approach report sound is decreased as the vehicle speed is lower. As the vehicle speed is higher, the output ratio of the approach report sound is increased. In this case, because the asymptote a2 of the temperature increasing curve changes according to the output ratio, the temperature increasing curve can be set to correspond to the change in the output ratio by multiplying the asymptote a2 by the output ratio.

According to the embodiment, the sound pressure of the approach report sound is corrected based on the speaker temperature. For example, the voltage level of the voltage waveform signal of the approach report sound is corrected based on the speaker temperature. Further, the frequency of the approach report sound, or the sound pressure of each component in the frequency band currently used as an approach report sound is corrected.

Therefore, the approach report sound can be restricted from changing in response to a temperature change. The speaker temperature can be detected using the detection results of the temperature sensor 1b which detects the temperature of the other component at a position different from the speaker 3 in the vehicle and the temperature sensor 1c which detects the outside air temperature. For this reason, it becomes possible to correct the sound pressure output from the speaker based on the temperature without providing a temperature sensor only for detecting the temperature of the speaker 3 in the vehicle approach alert device.

Moreover, frequency gap in the speaker 3 can be controlled by correcting the frequency of the approach report sound based on the speaker temperature, e.g., the temperature of the cone paper. For this reason, the audible approach report sound can be restricted from changing even if the speaker temperature changes.

In the above embodiment, the sound pressure level of the approach report sound when actually output from the speaker 3 is controlled to a fixed value or within a predetermined range. The output ratio of the sound pressure level of the approach report sound may be changed according to the vehicle state such as accelerator opening degree in addition to the vehicle speed. For example, the output ratio of the sound pressure level of the approach report sound is increased as the vehicle speed or the accelerator opening degree is raised. Thus, a pedestrian can recognize an approach speed of the vehicle corresponding to the acceleration of the vehicle.

In such a case, fundamentally there is a fixed relation between the vehicle state and the output ratio relative to the sound pressure level of the approach report sound. This relation is also changed when the speaker temperature changes. For this reason, the amplitude coefficient k1 of the waveform signal of the approach report sound is calculated based on the speaker temperature, also in this case. Thus, the vehicle state and the output ratio with respect to the sound pressure level of the approach report sound can be set within the fixed relation by correcting the waveform signal of the approach report sound.

Similarly, also the frequency and the frequency band of the approach report sound can be changed according to the vehicle state such as vehicle speed and accelerator opening degree. In such a case, when the frequency or the frequency band of the approach report sound set according to the vehicle state is changed according to the speaker temperature, the effects explained in the above embodiment can be acquired.

In the above embodiment, the waveform signal of the approach report sound outputted from the signal generator of the microcomputer 21 is a signal already corrected. Alternatively, the voltage level and the frequency of the approach report sound, and the sound pressure of the frequency component in the frequency band currently used may be corrected outside of the microcomputer 21. For example, a voltage control part may be provided outside of the microcomputer 21, and a non-corrected signal of the approach report sound may be input to the voltage control part. The microcomputer 21 may output a control signal according to the correction amount in the amplitude constant k1, the frequency, and the like. In this way, the voltage level of the approach report sound can be corrected by the voltage control part based on the control signal, such that the same effects can be acquired as the above embodiment.

The vehicle approach alert device 2 may be integrally formed with the speaker 3, or formed separately from the speaker 3.

Such changes and modifications are to be understood as being within the scope of the present disclosure as defined by the appended claims.

What is claimed is:

1. A vehicle approach alert device that outputs an approach report sound representing an approach of a vehicle from a sounding body, the vehicle approach alert device comprising:
   a memory part in which data of the approach report sound is memorized;
   a signal generator that reads out the data of the approach report sound from the memory part and that generates a voltage waveform signal of the approach report sound based on the data of the approach report sound;
   a calculator that calculates a temperature of the sounding body; and
   a correct part that corrects the approach report sound based on the temperature of the sounding body calculated by the calculator, wherein
   the calculator acquires information about a temperature detected by a temperature sensor located at a position different from the sounding body in the vehicle, and estimates the temperature of the sounding body based on the temperature detected by the temperature sensor.

2. The vehicle approach alert device according to claim 1, wherein
   the temperature sensor detects an outside air temperature outside of the vehicle, and
   the calculator acquires information about the outside air temperature, and estimates the temperature of the sounding body based on the outside air temperature.

3. The vehicle approach alert device according to claim 2, further comprising:
   another temperature sensor that detects a temperature of another component different from the sounding body in the vehicle, and
   the calculator acquires information about the temperature of the another component, and estimates the temperature of the sounding body based on the outside air temperature and the temperature of the another component.

4. The vehicle approach alert device according to claim 3, wherein
   the another component is one of a plurality of another components,
   the memory part memorizes a correlation between the temperature of the sounding body and the respective temperatures of the another components, and
   the calculator calculates a variation in the temperature of the sounding body from the outside air temperature based on the temperatures of the another components in the vehicle using the correlation and the information about the temperatures of the another components in the vehicle.

5. The vehicle approach alert device according to claim 4, wherein
   the calculator calculates multiplication values by multiplying the outside air temperature and the temperatures of the another components by respective predetermined coefficient, and
   the calculator calculates the temperature of the sounding body based on a sum of the multiplication values.

6. The vehicle approach alert device according to claim 5, wherein
   the calculator acquires information about a speed of the vehicle,
   the calculator calculates a reduction value by multiplying the speed of the vehicle by a natural cooling coefficient of the sounding body corresponding to the speed of the vehicle, and
   the calculator calculates the temperature of the sounding body by subtracting the reduction value from the sum.

* * * * *